No. 707,097. Patented Aug. 19, 1902.
W. GARY.
BEET HARVESTER.
(Application filed Feb. 21, 1902.)
(No Model.)
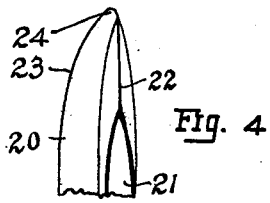
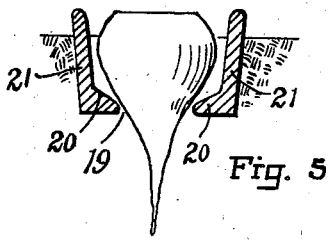
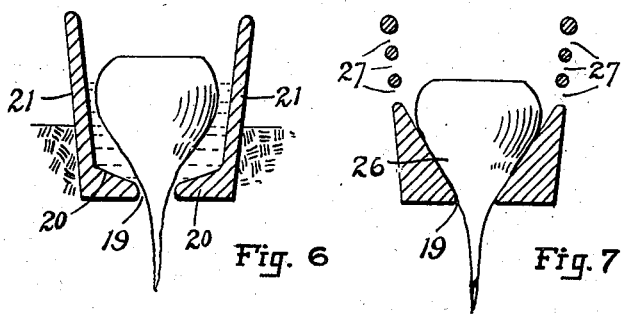
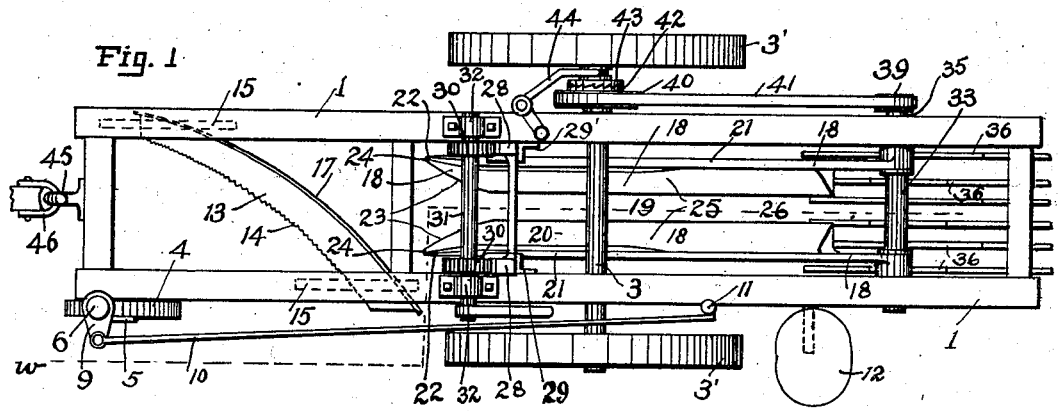
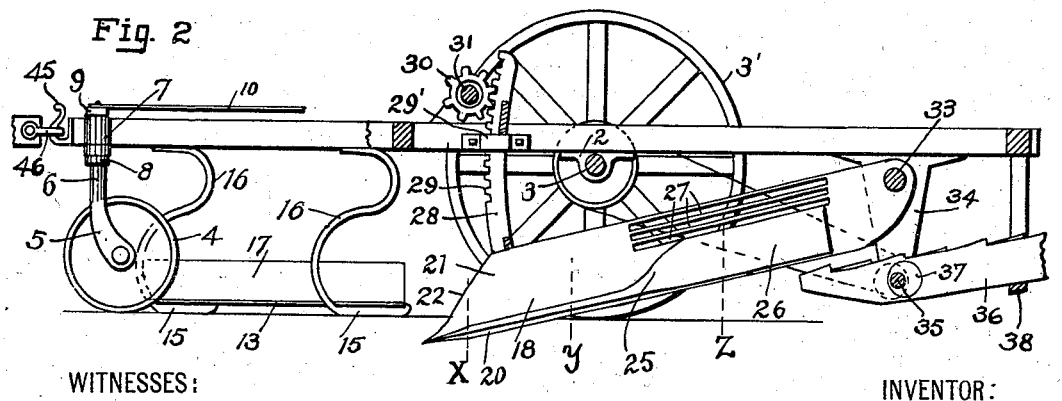
WITNESSES: INVENTOR:
Walter Gary,
BY
Louis Bagger & Co.,
ATTORNEYS

UNITED STATES PATENT OFFICE.

WALTER GARY, OF SAGINAW, MICHIGAN, ASSIGNOR OF ONE-HALF TO BURTON OSTROM, OF SAGINAW, MICHIGAN.

BEET-HARVESTER.

SPECIFICATION forming part of Letters Patent No. 707,097, dated August 19, 1902.

Application filed February 21, 1902. Serial No. 95,088. (No model.)

*To all whom it may concern:*

Be it known that I, WALTER GARY, a citizen of the United States, residing at the city of Saginaw, in the county of Saginaw and State of Michigan, have invented a new and useful Improvement in Beet-Harvesters, of which the following is a specification.

The object of my invention is to provide a simple and practical beet-harvester that will with a minimum expenditure of power top the beets, pull them from the ground, and shake off the soil, leaving the beet clean enough for the market.

The invention consists, substantially, in the novel construction, combination, and arrangement of the parts, as will be hereinafter fully set forth, and pointed out in the claims.

Reference is to be had to the accompanying drawings, forming a part of this specification, in which similar characters of reference indicate corresponding parts in all figures.

Figure 1 is a plan view of my improved beet-harvester. Fig. 2 is a longitudinal section of Fig. 1 on line W. Fig. 3 is an isometrical view of one of the plow-points. Fig. 4 is an enlarged plan view of one of the plow-points. Fig. 5 is a cross-section of the plows on line X, Fig. 2, showing the relative positions of the plow and beet. Fig. 6 is the same as Fig. 5, taken on line Y, Fig. 2. Fig. 7 is the same as Fig. 5, taken on line Z, Fig. 2.

In the drawings, 1 is the frame, to which the boxes or bearings 2 are secured. Passing through boxes 2 is an axle 3, wheels 3' secured to the ends, which carry the rearward part of frame 1. The front end of the frame 1 is supported by the steering-wheel 4, journaled in the forked arms 5 of a shaft 6, which is journaled vertically in bearing 7. The bottom of bearing 7 rests on the collar 8, secured to shaft 6, the position of the collar controlling the height of the frame from the ground.

9 is a lever-arm rigidly secured to the top of shaft 6, to the outer end of which is connected the forward end of the shifting rod 10. The rear end of the same is connected to a hand-lever 11, within easy reach of the operator's seat 12.

13 is a curved knife or cutter of thin metal, with the cutting edge composed of fine sharpened V-shaped teeth 14. The knife 13 is secured to shoes or runners 15, which act as a gage to keep the knife always the same distance from the ground. The runners 15 are secured to the frame by means of the depending spring-arms 16, which tend to crowd the runners to the ground, but are rigid enough to carry any rearward pull caused by the cutter while operating.

To the edge of the knife 13 and opposite the cutting edge 14 is secured the deflecting-shield 17, which slides the tops to one side after being cut off.

18 represents the plows for pulling or lifting the beets from the ground, the forward ends being substantially two parallel inclined almost L-shaped members rigidly connected, so as to leave a central parallel space 19 between the lower flanges 20. The lower flanges 20 slope toward the opening 19 and the upright or side flanges 21 flare outwardly. (See Fig. 6.) The front edge of the flanges 21 is sharpened to form a cutting edge 22, while the bottom flanges 20 are cut away at the forward ends 23 and sharpened only at the points 24 where the side and bottom flanges meet.

Near the center 25 of the plows 18 the slope of the bottom flanges 20 is gradually made more acute until they form a V-shaped trough 26, with the parallel open space 19 at the bottom of the V (see Fig. 7) extending to the rear of the plows, while at the same time the side flanges are provided with openings 27, which, with the open space 19, will relieve the beet of almost all surplus earth and still retain the beet. The front ends of the plows are adapted to enter the soil or to be raised entirely clear of same by means of the adjustable lateral arms 28 and rack 29, working in guides 29' on the frame 1. Pinions 30, meshing with rack 29, are secured to shaft 31, which is journaled to the frame 1 at 32. By revolving shaft 31, and with it the pinions 30, the plow-points may be raised or lowered at will. As any of the old and well-known methods of revolving shaft 31 and locking same in position may be used, I have not shown any particular one. The rear ends of the plows are pivotally connected to the frame 1 by the shaft 33 at such a height as to give the plows an incline, substantially as shown.

To the rear and in line with the plows 18 a frame 34 is suspended, in which is journaled a shaft 35, to which a series of notched bars 36 are eccentrically connected by eccentric-wheels 37, each alternate bar being connected opposite, so that when shaft 35 is revolved eccentrics 37 will force each alternate bar 36 upward and forward while the remaining bars are moving downward and rearward, making a kicking movement and so serving as an elevator and at the same time a kicking-screen to clean the beets of all remaining soil. The outer ends of the bars 36 slide on and are guided in grooves in the bracket 38, suspended from frame 1.

Motion may be imparted to the shaft 35 from the main axle 3 when the same is in motion, as follows: On one end of shaft 35 a sprocket-wheel 39 is rigidly mounted, which is connected to a sprocket-wheel 40, loosely mounted on the axle 3, by a sprocket-chain 41. To the sprocket-wheel 40 is secured one member 42 of a clutch. The other member 43 is feathered on the axle 3 and is adapted to be thrown in or out of gear with member 42 by the lever 44, pivoted to the frame, or any other of the usual means may be adopted.

To the front of the frame 1 is secured a hook 45, to which the tongue is flexibly connected by a clevis 46.

The operation is as follows: As the vehicle moves forward it is guided by the operator into the exact path of the beet by the steering-wheel 4, controlled from the operator's seat by the hand-lever 11, shifting bar 10, and lever-arm 9. The knife 13, whose height from the ground is regulated by the runners 15, comes in contact with the tops of the beet and being curved and set at an angle gives it a draw cut and by the aid of the teeth 14 saws and cuts off the tops of the beets with but little effort. The tops are then thrown to one side by the deflecting-shield 17. Following the cutter the plows 18 now cut a strip of soil on each side of the beet and about two-thirds the depth of same or to such a depth that the bottom flanges 20 will strike under the flaring sides of the beets, as shown in Figs. 5 and 6. As the plow now moves forward the earth around the beet will be confined in the angle formed by the bottom flanges 20 and sides 21, and as the slice of soil advances up the incline of the plows it will force the beet to rise with it, the confined earth acting as a cushion, so as not to bruise the beet. The lower part of the beet will hang in the space 19. (See Fig. 6.) As the vehicle continues to move forward the beets and earth continue to advance up the incline of the plows until they reach the point 25. At this point most of the soil will fall through the parallel space 19, it now being clear of the ground and openings 27 in the side flanges of the plows. As the soil leaves the beet the same is caught and carried in the V-shaped trough 26, which gives plenty of bearing-surface to prevent damage to the beet. (See Fig. 7.) The following beets will shove the first beets ahead until they fall out of trough 26 onto the shaking-bars 36, to which power is being imparted from the axle 3 through the medium of the clutch 42 and 43 and sprocket-wheel 40, mounted thereon and connected to sprocket-wheel 39, mounted on shaft 35, by sprocket-chain 41, shaft 35, with eccentrics 37 mounted thereon, driving the kicking-bars of the shaker.

The shaker may be set at an angle so as to elevate the beets, if desired, but will in either a flat or inclined position kick and tumble the beets until the remaining soil is removed from the beets, leaving them clean enough for the market.

Changes within the form, proportion, size, and the minor details of construction within the scope of the invention may be resorted to without sacrificing any of the advantages of this invention.

What I claim is—

1. In a harvester, a frame and a plow adjustably carried by said frame, the plow being formed by two inclined L-shaped parallel members separated by a parallel open space between the lower flanges, the side flanges being sharpened and the bottom flanges being cut away in front to form a point with the side flanges, substantially as shown and described.

2. In a harvester, a frame and a plow adjustably connected thereto, the front half of the plow being formed of two parallel inclined L-shaped members separated by a parallel open space between the bottom flanges, the rear portion of said members forming a V-shaped trough open at the bottom.

3. In a harvester, a plow composed of two parallel L-shaped members, with an open space between the bottom flanges, the side flanges being sharpened and the bottom flanges being cut on a curve in front to form a point with the side flanges, the rear portion of said members being shaped so as to form a V-shaped trough open at the bottom and having openings in the sides for relieving the plow of surplus earth, substantially as shown and described.

In testimony whereof I have hereunto set my hand in presence of two subscribing witnesses.

WALTER GARY.

Witnesses:
 H. PISTORIUS,
 BURTON OSTROM.